United States Patent
Ates et al.

(10) Patent No.: US 10,886,523 B2
(45) Date of Patent: Jan. 5, 2021

(54) ELECTROPLATING LITHIATED TRANSITION METAL OXIDES USING LOW PURITY STARTING PRECURSORS

(71) Applicants: Mehmet Nurullah Ates, Kettering, OH (US); John David Busbee, Beavercreek, OH (US); Chadd Timothy Kiggins, Dayton, OH (US); John Berkeley Cook, Beavercreek, OH (US)

(72) Inventors: Mehmet Nurullah Ates, Kettering, OH (US); John David Busbee, Beavercreek, OH (US); Chadd Timothy Kiggins, Dayton, OH (US); John Berkeley Cook, Beavercreek, OH (US)

(73) Assignee: Xerion Advanced Battery Corporation, Kettering, OH (US)

(*) Notice: Subject to any disclaimer, the term of this patent is extended or adjusted under 35 U.S.C. 154(b) by 0 days.

(21) Appl. No.: 16/418,438

(22) Filed: May 21, 2019

(65) Prior Publication Data
US 2019/0363340 A1    Nov. 28, 2019

Related U.S. Application Data

(60) Provisional application No. 62/676,043, filed on May 24, 2018.

(51) Int. Cl.
*H01M 4/04* (2006.01)
*C25D 9/08* (2006.01)
*H01M 4/485* (2010.01)

(52) U.S. Cl.
CPC ............ *H01M 4/0454* (2013.01); *C25D 9/08* (2013.01); *H01M 4/485* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0170303 | A1* | 6/2014 | Rayner | C25D 1/22 427/58 |
| 2014/0272580 | A1* | 9/2014 | Frianeza-Kullburg | H01M 4/366 429/218.1 |
| 2016/0028081 | A1* | 1/2016 | Zhang | C01G 45/1221 429/231.1 |

* cited by examiner

*Primary Examiner* — Christopher P Domone
(74) *Attorney, Agent, or Firm* — O'Banion & Ritchey LLP; John P. O'Banion

(57) ABSTRACT

A method for electroplating (or electrodeposition) a lithiated transition metal oxide composition using low purity starting precursors. The method includes electrodepositing the electrochemically active material onto an electrode in an electrodeposition bath containing a non-aqueous electrolyte. The lithiated metal oxide can be used for various applications such as electrochemical energy storage devices including high power and high-energy lithium-ion batteries.

20 Claims, 12 Drawing Sheets

ELECTROPLATING LITHIATED TRANSITION METAL OXIDES USING LOW PURITY STARTING PRECURSORS

CROSS REFERENCE TO RELATED APPLICATIONS

This application claims the benefit of and priority to the filing date of U.S. provisional application Ser. No. 62/676, 043 filed May 34, 2018, incorporated herein by reference in its entirety. This application is related to U.S. application Ser. No. 15/362,993 entitled LITHIATED TRANSITION METAL OXIDES, issued on Oct. 3, 2017 as U.S. Pat. No. 9,780,356, incorporated herein by reference in its entirety. This application is also related to U.S. application Ser. No. 16/143,453 filed Sep. 27, 2018, entitled ELECTROPLATING TRANSITIONAL METAL OXIDES, published on Apr. 4, 2019 as U.S. Pat. Pub. 2019/0100850 A1, incorporated herein by reference in its entirety.

FIELD OF THE INVENTION

The present disclosure relates to a method for electroplating (or electrodeposition) a lithiated transition metal oxide composition using low purity starting conventional (e.g. LiOH) and unconventional precursors (e.g. $Li_2SO_4$ and LiCl). The final product i.e. lithiated transition metal oxides (LTMOs) can be used in fuel cells, structural components, super capacitors, metal-air, primary and secondary Li-ion batteries.

Lithium ion batteries (LIBs) have spurred great interest in the realm of energy crisis owing to their high energy densities. They are comprised of a cathode, which host Li ions, a Li-ion containing electrolyte, a separator and an anode in which Li-ions can be intercalated/alloyed into and de-intercalated/de-alloyed from.

One of the widely used commercial methods to manufacture lithium ion active material uses the active material (i.e. graphite, $LiCoO_2$), which is mixed with conductive agent (e.g. super P, carbon black, acetylene black) and polymeric binder (e.g. polyvinylidene fluoride). These components are homogenized together in N-methyl pyrrolidone (NMP) to form a slurry. This slurry is cast on a two-dimensional substrate (typically Al or Cu foils) and dried. This widely used method has several critical drawbacks. The use of NMP as the carrier solvent during homogenation requires the recapture of this toxic solvent during drying, leading to additional initial capital costs as well as ongoing recurring costs. Furthermore, this coating process yields electrodes with high interfacial resistance between the poorly conductive active materials, and propensity to delaminate at high mass loading. Electroplated LTMOs can be synthesized and formed into electrodes, which is currently a multi-step process, in just one step (see U.S. Pat. No. 9,780,356 B2, Lithiated transition metal oxide, issued Oct. 3, 2017 to Huigang Zhang, John D. Busbee, Hailong Ning, Thuy D. Dang, Kevin A. Arpin; and *Electroplating lithium transition metal oxides*, Huigang Zhang, Hailong Ning, John Busbee, Zihan Shen, Chadd Kiggins, Yuyan Hua, Janna Eaves, Jerome Davis, Tan Shi, Yu-Tsun Shao, Jian-Min Zuo, Xuhao Hong, Yanbin Chan, Shuangbao Wang, Peng Wang, Pengcheng Sun, Sheng Xu, Jinyun Liu, and Paul V. Braun, Science Advances, Vol. 3, no. 5, e1602427, 2017). This method doesn't use toxic NMP, and therefore, does not require the expensive solvent recapturing step required for traditional slurry casting methods.

The synthesis of LTMOs, both industrially and academically, are produced at high temperature (800-1100° C.) (see U.S. Pat. No. 5,885,544, Lithium cobaltate based positive electrode-active material for lithium secondary cell and method of manufacturing same, issued Mar. 23, 1999 to Nobuyuki Yamazaki, Kathuyuki Negishi, and *Solid-State Redox Reactions of LiCoO2 (R3m) for 4 Volt Secondary Lithium Cells*, Tsutomu Ohzuku and Atsushi Ueda, *J. Electrochem. Soc., Vol.* 141, No. 11, November 1994). As a result, high purity (>99%) starting materials are required to ensure that there are no inclusions of secondary materials in the final product that can lead to performance degradation and safety issues. The fundamental mechanism of the electrodeposition process described herein enables the use of low purity starting materials, down to 50% purity, for a wide range of starting materials and impurities.

SUMMARY OF THE INVENTION

In the present invention, a novel approach is described which aims to decrease the production cost of LTMOs by using low cost/low purity raw materials. In addition, the use of low purity precursors could enable various new raw material sources that are unusable, without considerable purification (and cost), for traditional LTMOs manufacturing. The purification of high purity raw materials to synthesize LTMOs typically requires the use of toxic chemicals and energy intensive processes, which in turn add considerable cost to the final price of the Li-ion battery. Up until now, all commercially available lithium metal oxide production methods such as solid state, wet, sol-gel etc. are required to use at least 98% purity Li and 95% purity transition metal precursors (see *Ultrathin Coatings on Nano-$LiCoO_2$ for*, Isaac D. Scott, Yoon Seok Jung, Andrew S. Cavanagh, Yanfa Yan, Anne C. Dillon, Steven M. George, and Se-Hee Lee, *Nano Lett.*, 2011, 11 (2), pp 414-418) which are responsible for a significant portion of the final battery cost. In addition, conventional solid-state synthesis methods do not utilize $Li_2SO_4$ and LiCl precursors as Li source because their anions ($SO_4^2$ and $Cl^-$) are not stable and react with LTMOs during high temperature heat treatment of LTMOs (see *Improvement of Structural Stability and Electrochemical Activity of a Cathode Material LiNi0.7Co0.302 by Chlorine Doping*, Xinlu Li, Feiyu Kang, Wanci Shen, Xinde Bai, *Electrochemica Acta,* 53, 2007, 1761-1765). Due to this side reaction, conventional techniques to manufacture LTMOs utilize mainly $LiOH.H_2O$, LiOH, $Li_2CO_3$, LiNO3, Li(CHOOCH3) as their Li source (see. *Lithium Recovery from Aqueous Resources and Batteries: A Brief Review*, Ling Li, Vishwanath G. Deshmane, M. Parans Paranthaman, Ramesh Bhave, Bruce A. Moyer, Stephen Harrison, Johnson Matthey *Technol. Rev.,* 2018, 62, (2), 161-176). This patent application therefore demonstrates new routes to synthesize LTMOs with unconventional starting Li and transition metal precursors such as LiCl, $Li_2SO_4$, and $CoCl_2$.

Electroplating is an element specific technique that can be used to manufacture LTMOs as demonstrated by U.S. Pat. No. 9,780,356 B2 Lithiated transition metal oxide, issued Oct. 3, 2017 to Huigang ZHANG, John D. BUSBEE, Hailong Ning, Thuy D. Dang, and Kevin A. Arpin, incorporated by reference herein in its entirety. The aim of the '356 patent was to describe the method of plating LTMOs from a molten salt eutectic without any disclosure as to the required raw material purity. The foundation of the current invention is to demonstrate the ability to use low purity starting materials from both conventional and unconventional Li and transition metal (TM) sources to create high purity LTMOs from a molten salt eutectic. To our knowledge, reports of the synthesis of high purity LTMOs from low purity raw materials (50%-95%) have not been reported. The method described herein demonstrates that high purity LTMOs that perform as good as or in some cases better than traditional LTMOs can be synthesized and formed into an electrode from starting materials with purities as low as 50%. This technology should enable the direct use, or require only preliminary purifications, of some common ores (e.g., spodumene lithium-aluminum-silicate) and some common lithium containing brines. Low purity salts don't require extensive multiple processing steps, energy expenditure, water consumption, and stringent high starting purity requirements. As a result, the financial cost is lower, the economic impact is lower and the processing speed is faster. Applicants have taken advantage of the previously patented technology by Xerion Advanced Battery Corp. (XABC) to overcome cost challenges associated with Li and TM refinement processes. The electroplating solution is non-aqueous and comprised of eutectic points of one of the several Li precursors (LiOH, $Li_2SO_4$, $LiCl_3$, $LiNO_3$, LiI, LiBr) with KOH being the major constituents of the eutectic bath. Depending on the desired final LTMO, a transition metal source (Co, Mn, Ni, Al, Fe, Cu, Zn, V, Ti) is also added to the eutectic bath.

One of the embodiments of this invention was demonstrated by synthesizing $LiCoO_2$ particles from a eutectic bath which contained low purity (85% purity) LiOH. In this example, the low purity LiOH material was prepared by mixing 98% purity LiOH (impurity 1:1 $Li_2CO_3$ & $Li_2SO_4$ per manufacturer) with other commonly found impurities that were specified by the manufacturer (namely $Li_2SO_4$ and $Li_2CO_3$). In addition to these major impurities there are other impurities present in $Li_2SO_4$ and $Li_2CO_3$. These impurities are at the ppm level and can be following elements based on the specification sheet provided by the vendor: Ca, Cd, Co, Cr, Cu, Fe, K, Mg, Mn, Na, Ni, Pb, Zn, $SO_4$—, Cl— and $NO_3$. In this example, three-dimensional stainless-steel fibers (SSF), cobalt wire and Ni foil were used as the working electrode, reference electrode and counter electrode, respectively. These three electrodes are immersed into the molten salt and multiple 1.2V (versus cobalt wire reference electrode) potential pulses were applied. The pulse range is from 100 µs to 20 s. (see U.S. Pat. No. 9,780,356 B2, Lithiated transition metal oxide, issued Oct. 3, 2017 to Huigang Zhang, John D. Busbee, Hailong Ning, Thuy D. Dang, and Kevin A. Arpin incorporated by reference herein in its entirety). Various characterization methods were employed to verify the characteristics of the LTMO, and demonstrates the physical and electrochemical properties are identical and/or superior in some cases compared to material synthesized using conventional high temperature methods. This demonstrates that starting with 85% purity LiOH highly pure LCO can be made, which is elaborated in below. Applicants have also run elemental Sulphur analysis of the final LCO electrodes prepared from both 98% and 85% purity of $Li_2SO_4$ using X-ray florescence and did not find any Sulphur within the detection limit of the instrument. Extensions of this embodiment were also carried out using various purities of the lithium source while maintaining the standard purities of the two other bath constituents CoOH (97%) and KOH (85%). We successfully demonstrate that various purities of LiCl (85-50%) and $LiSO_4$ (85%), and finally various purities of the TMO (e.g. 85% CoOH) can be used in the method of the present invention. The details of the specific impurities will be found in the "Detailed Description of the Invention."

DETAILED DESCRIPTION OF THE INVENTION

Figure 1:
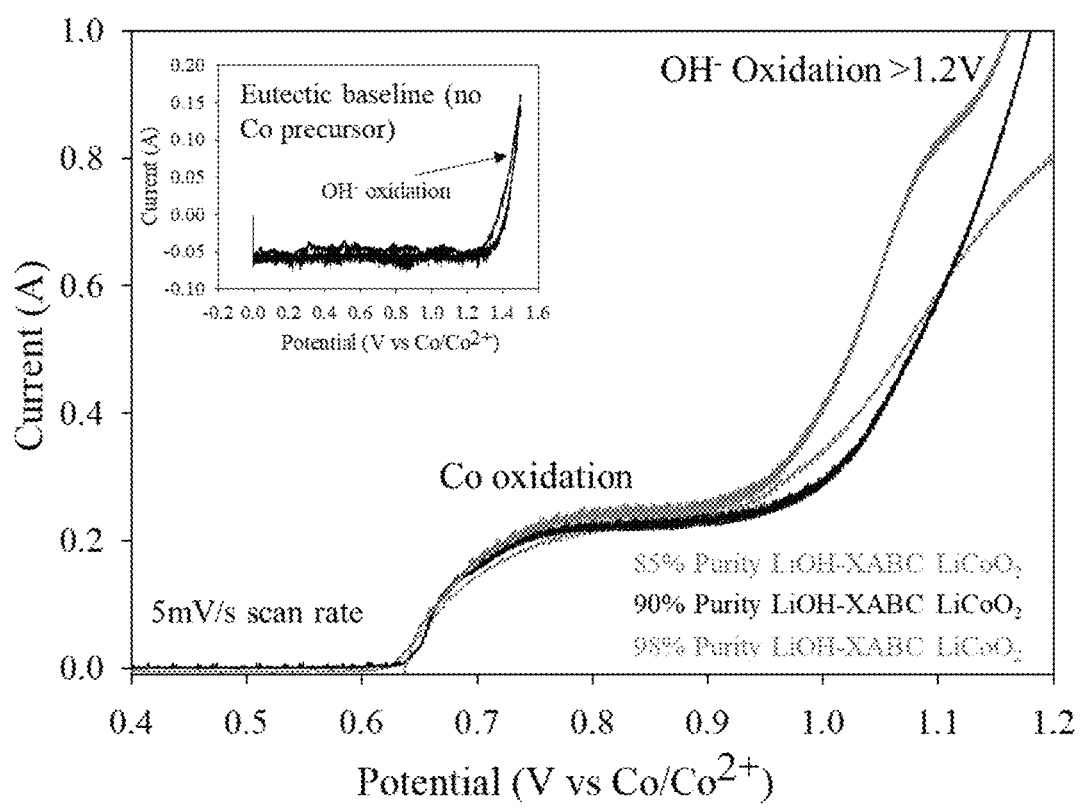
FIG. 1. Cyclic voltammetry of LiOH (98%)/KOH, LiOH (90%)/KOH, LiOH (85%)/KOH baths containing $Co(OH)_2$ at 5 mV/s scan rate at 260° C.

In general, the present invention relates to a method of forming a lithiated transition metal oxide comprising the steps of (a) immersing a working electrode into a non-aqueous electrolyte comprising a lithium source and a transition metal source, wherein the lithium and transition metal source are both of low purity; (b) electrodepositing a lithiated transition metal oxide onto a surface of the working electrode from the electrolyte at a temperature in excess of the melting temperature of the non-aqueous electrolyte; (c) removing the working electrode from the bath and; (d) rinsing the electrodeposited lithiated transition metal oxide.

In a preferred embodiment, the electrodeposition is done by applying a constant voltage ranging from 0.6V to 1.4V versus Cobalt wire reference electrode or by applying constant current ranging from 1 uA/cm2 to 100 A/cm2, or applying a voltage and/or current pulses intermittently.

In a preferred embodiment, the low purity lithium source is selected from the group consisting of LiOH, $Li_2CO_3$ LiF, LiCl, LiBr, LiI, $LiNO_3$, $LiNO_2$, $Li_2SO_4$, and combinations thereof.

In a preferred embodiment, the low purity transition metal source is selected from the group consisting of $MnCl_2$, $MnSO_4$, $Mn_2O_3$, $MnO_2$, $Mn_3O_4$, CoO, $Co_2O_3$, $Co_3O_4$, $CoOH_2$, $CoCl_2$, $CoSO_4$, and combinations thereof.

The low purity lithium and transition metal sources have a purity ranging from about 50% to about 98% by weight, more preferably from about 50% to about 95% by weight, and most preferably from about 50% to about 85% by weight.

Preferably the non-aqueous electrolyte comprises an inorganic molten salt, wherein at least 50%, and preferably 99% of the ions comprised by the inorganic molten salt electrolyte are inorganic ions. The inorganic molten salt electrolyte can comprise a hydroxide salt, a halide salt, a nitrate salt, a sulfate salt or a combination thereof. In a preferred embodiment, the inorganic molten salt electrolyte comprises a hydroxide salt selected from the group consisting of LiOH, KOH, NaOH, RbOH, and CsOH, a halide salt selected from the group consisting of LiCl, LiF, KF, KCl, NaCl, NaF, LiBr, NaBr, KBr, LiI, NaI, KI, a nitrate salt selected from the group consisting of $LiNO_3$, $NaNO_3$, and $KNO_3$, a nitrite salt selected from the group consisting of $LiNO_2$, $NaNO_2$, $KNO_2$, a $Li_2SO_4$ sulfate salt, and combinations thereof.

In one embodiment, the inorganic molten salt electrolyte comprises a nitrite salt selected from the group consisting of $LiNO_2$, $NaNO_2$, $KNO_2$, and combinations thereof.

In another embodiment, the inorganic molten salt electrolyte comprises a hydroxide salt selected from the group consisting of LiOH, KOH, NaOH, CsOH, and combinations thereof.

In another embodiment, the inorganic molten salt electrolyte comprises a $Li_2SO_4$ sulfate salt.

The electrodeposited lithiated transition meal oxide is preferably conformally coated onto the working electrode. In a preferred embodiment, the working electrode is a three-dimensional porous nanostructured structure. The three-dimensional porous working electrode preferably has a void volume fraction (porosity) between 1% and 99%.

The working electrode comprises an electrically conductive material selected from the group consisting of metals, metal alloys, metallic ceramics, electrically conductive carbon, electrically conductive polymers, and electrically conductive composite materials. In a preferred embodiment, the working electrode is a metal or metal alloy selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof.

In another preferred embodiment, the working electrode is a planar foil with thickness ranging from 1 um to 100 mm or a porous foam with porosity ranging from 1% to 99% porosity.

The thickness of the electrodeposited lithiated transition metal oxide preferably ranges from about 10 nm to about 500 μm. The electrodeposited lithiated transition metal oxide material can also be in the form of a powder, and wherein the powder can be scraped off.

The electrodeposition is carried out at relatively low temperatures ranging from 100° C. to 600° C. Preferably, the electrodeposition temperature is from about 300° C. to about 500° C.

The electrodeposition can be carried out in an ambient or an inert atmosphere.

In a preferred embodiment, the electrodeposited lithiated transition metal oxide is lithium cobalt oxide characterized by an XRD spectrum containing a doublet peak at approximately between 63 and 70 2Θ degrees.

Electroplating of a lithiated transition metal oxide was carried out using a 3-electrode system where a working electrode, a counter (Ni foil), and a pseudo reference (Co metal) electrode were immersed into a eutectic solution, which is also called a molten salt, containing a transition metal and Li ions source. Preferably, the transition metal source comprises an oxide, hydroxide, halide or sulfate of at least one transition metal. The transition metal can be aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof. The Li source can be LiOH, $Li_2SO_4$, LiCl, LiI, LiBr, $LiNO_3$, $LiNO_2$, LINO and mixtures thereof.

Figure 2:
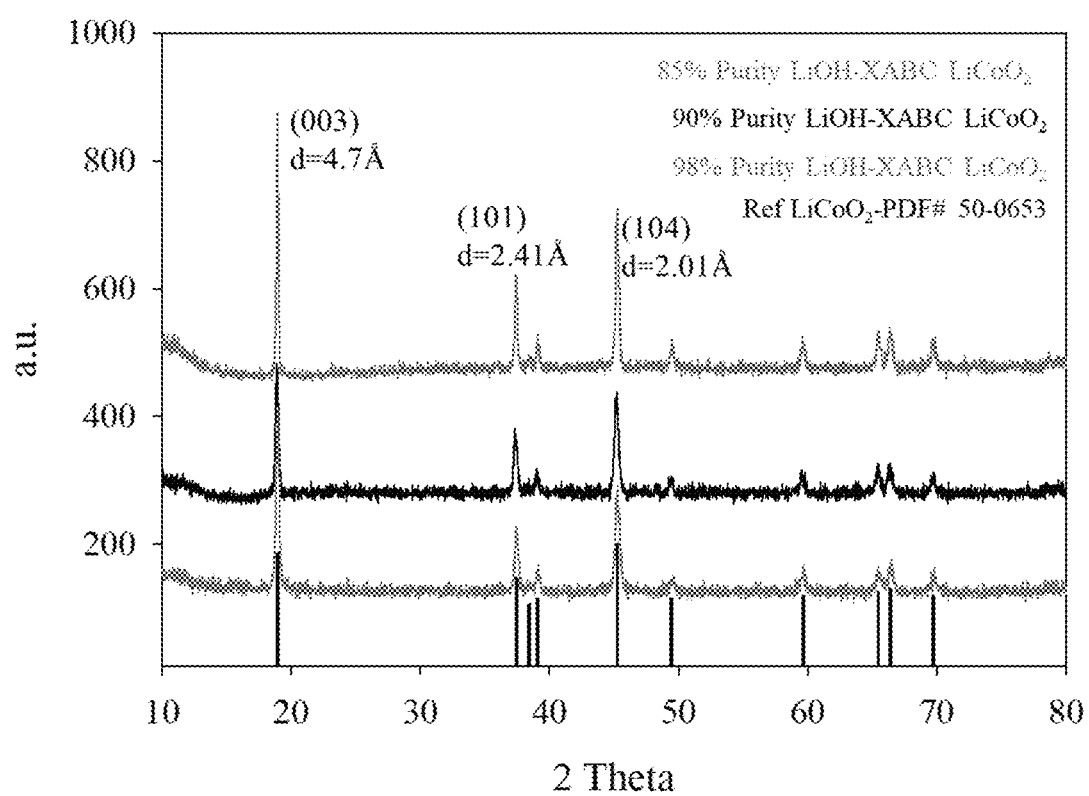
FIG. 2. XRD patterns of electroplated $LiCoO_2$ powders obtained from LiOH (98%)/KOH, LiOH (90%)/KOH, LiOH (85%)/KOH eutectic baths containing $Co(OH)_2$.
Figure 3:
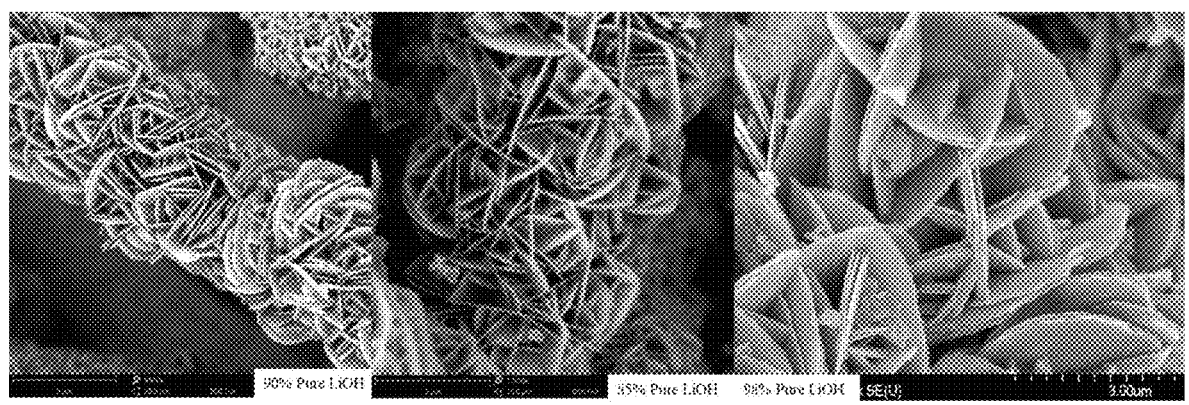
FIG. 3. HRSEM figure of $LiCoO_2$ particles obtained from LiOH (98%)/KOH, LiOH (90%)/KOH, LiOH (85%)/KOH eutectic baths containing $Co(OH)_2$.

The eutectic system can provide a relative low synthesis temperature (100°-800° C.). The eutectic temperature is known as the melting point which is lower than any composition made up of the mixture. Above the eutectic temperature, the liquid phase is generally called molten salt. For electrodepositing on a working electrode, a molten salt system should have low temperature to protect the working electrode and possess high solubility of transition metal sources. Low-temperature molten salt is usually selected by checking the eutectic points in the phase diagrams. Molten salt bath is prepared with at least one of chemicals including hydroxides (KOH, NaOH, RbOH, CsOH etc), halides (KF, KCl, NaCl, NaF, NaBr, KBr, NaI, KI, $AlCl_3$ etc), nitrate ($NaNO_3$, $KNO_3$), nitrite ($NaNO_2$, $KNO_2$), and sulfates ($Na_2SO_4$, $K_2SO_4$). The Ni crucible was used as the reaction vessel and glass lid was used to hang the abovementioned electrodes into the eutectic solution. All three electrodes were connected to a power supply which provides sufficient voltage or current densities where electrochemically active lithiated transition metal oxide materials were produced. These materials are of great interest to the Li-ion battery industry. FIG. 1 shows the cyclic voltammetries (CVs) of several KOH/LiOH molten salt systems containing different percentages of LiOH impurities (98%, 90% and 85%) which all of the baths contain $CoOH_2$ species as Co source. The 90% and 85% pure LiOH powders were prepared by grinding appropriate percentages of $Li_2CO_3$ and $Li_2SO_4$ with 98% pure LiOH. As can be seen from CV profiles, in all cases $Co^{2+}$ ions start to be oxidized at relatively similar potentials i.e. 0.7V. All three profiles in FIG. 1 resemble each other suggesting that there are most likely no electrochemically active impurities present during electroplating. The sharp increase in current appearing above 1.2V is due to the oxidation of OH— groups originating from KOH and LiOH salts which are the major components of the molten salt. To further support this, the inset figure in FIG. 1 also shows the CV of the KOH/LiOH bath without the presence of Co source which demonstrates that there is only one oxidation peak which corresponds to anion oxidation. The potentials shift after Co oxidation is minor which could be due to the water content of the molten salt. As seen in FIG. 1 (inset) the eutectic bath is stable for plating $LiCoO_2$ nano-flakes to 1.4 V vs. $Co/Co^{2+}$. We found the optimum voltage pulse to be 1.2V versus Co reference electrode. All voltage values are reported versus $Co/Co^{2+}$ pseudo reference electrode. As can be seen from FIG. 2, all $LiCoOh_2$ powders have very similar XRD patterns irrespective of the starting material impurity percentages. They all possess R3m phase of layered structure and have similar lattice parameters. Every diffraction peak can be assigned to Joint Committee on Powder Diffraction Standards (JCPDS) card no 50-0653 indicating that the materials made from these impure starting materials are crystallographically identical to standard lithium cobalt oxide. Of particular importance, the presence of the doublet peak in all patterns around 65-70 2$\Theta$ degrees suggest that layered feature of the crystal structure is preserved regardless of the impurity percentages. High resolution scanning electron microscopy images exhibited in FIG. 3 shows that the $LiCoO_2$ particles have very similar morphological features. This set of images demonstrates that the raw material impurities present in LiOH do not affect the morphology of the final product.

In one example, 120 g of KOH, 20 g LiOH, and 5 g $CoOH_2$ are added to the bath and monitored that they are dissolved thoroughly. The color of the melt changed from transparent color to blue as the divalent $Co^{2+}$ ions are coordinated by hydroxide ions. This is followed by immersing the 3-electrode lid into the molten salt. Afterwards, 1.2V (versus cobalt wire reference electrode) potential pulses were applied. The pulse range is from 1 μs to 20 s where a SSF, Ni foil and Co wire are used as working, counter, and pseudo reference electrodes, respectively. Between pulses, there was an open circuit voltage period (ranging from 1 μs to 60 minutes). This resting period allows ions to move into the voids of SSF thereby conformal deposition is achieved. Number of deposition cycles (duty cycle refers to on/off time) determines the loading of the sample. Constant voltage or current densities will also lead to the formation of the metal oxide however the electroplated material will not cover the 3D substrate conformally. Nevertheless, one can use this method to obtain powder form of the lithiated metal oxide. By simply changing the transition metal to a Mn source, one can also produce $Li_xMn_yO_z$ material.

After electroplating $LiCoO_2$ on the working electrode, the electrode quickly is rinsed with deionized water thoroughly to ensure no residual KOH or LiOH salts remain. Since $CoOH_2$ is not soluble in water, a chelating agent, such as citric acid, would help to dissolve $Co^{2+}$. If $CoOH_2$ traces are not removed, during heat treatment this would form $Co_3O_4$ particles that are not formed during electroplating. Removal of $Co^{2+}$ ions can be simply done by immersing the lithiated transition metal oxide electrode into an approximately 0.4M citric acid aqueous solution for 1 minute.

Figure 4A:
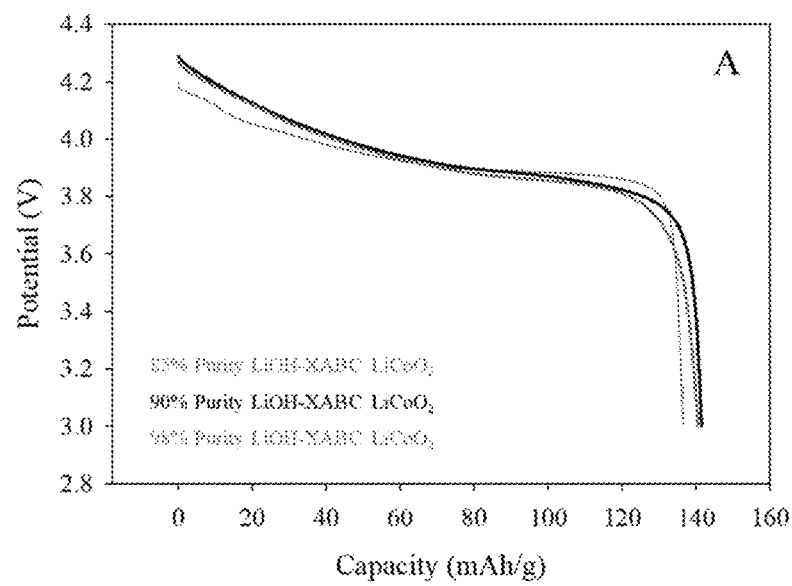
FIG. 4A. Discharge profiles of $LiCoO_2$ cathode active materials obtained from LiOH (98%)/KOH, LiOH (90%)/KOH, LiOH (85%)/KOH eutectic baths containing $Co(OH)_2$. The cells were cycled between 4.25 and 3V at C/5 rate.
Figure 4B:
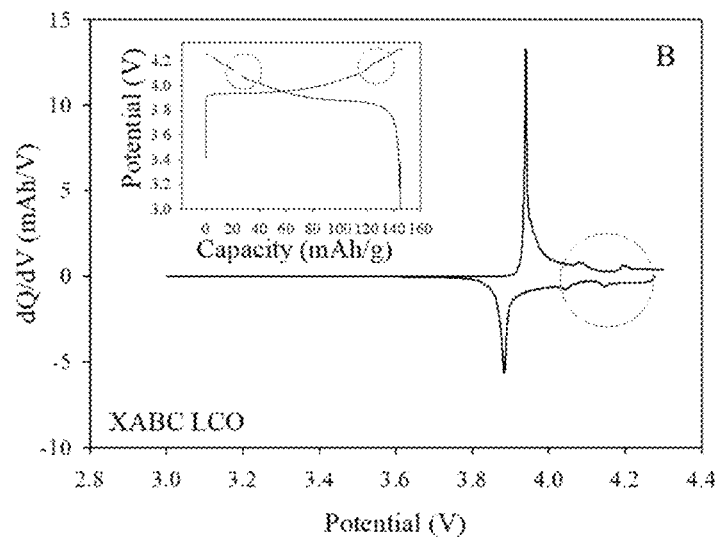
FIG. 4B. dQ/dV plot along with its charge-discharge profile for $LiCoO_2$ cathode obtained regular LiOH/KOH eutectic bath containing $Co(OH)_2$.

In one experiment, we employed stainless steel fibers (SSF) as the 3D scaffold working electrode. The plating procedure is as follows: 1.2V (versus $Co/Co^{2+}$) voltage pulses for 1 s on-time followed by 2 minutes rest between each voltage pulses. This ensured ions to diffuse inner pores of 3D scaffold leading to conformal LCO plating. Approximately, 20 cycles of these pulse plating procedures resulted in a 2 mAh/cm$^2$ loaded electrodes with around 145 mAh/g specific capacities, standard values in the literature. The electrochemical performances of the $LiCoO_2$ electrodes were tested and discharge profiles of $LiCoO_2$ obtained from different purity of LiOH precursor were plotted in FIG. 4A. The coin cell was constructed with $LiCoO_2$ cathode deposited onto SSF versus Li foil and separated with a commercially available 20 um polymer separator. The electrolyte was a traditional $LiPF_6$ dissolved in organic solvents. All of the $LiCoO_2$ electrodes in FIG. 4A delivered very identical capacities (~145 mAh/g) and voltage profiles resemble each other well. This electrochemical data further proves that neither 85% nor 90% pure LiOH have any negative effect on the characteristic of $LiCoO_2$ electrochemical discharge profile. FIG. 4B exhibits charge-discharge capacities of the $LiCoO_2$ electrode obtained from a regular molten salt bath. The plateaus indicated with the circles in FIG. 4B are indicative of a high level of crystallinity. During charging at 4.06V and 4.18V regions, a phase transformation takes place concomitant with the removal of Li ions from monoclinic and hexagonal phases, respectively (see *Microemulsion-based synthesis and electrochemical evaluation of different nanostructures of $LiCoO_2$ prepared through sacrificial nanowire templates*, Gautam Ganapati Yadav, Anand David, Huazhang Zhu, James Caruthers and Yue Wu, *Nanoscale*, 2014, 6, 860). These regions are considered a direct correlation with the quality of $LiCoO_2$ powders. Good crystallinity is desired as it is responsible for good performance characteristics like lifetime and high temperature storage resistance.

Figure 5:
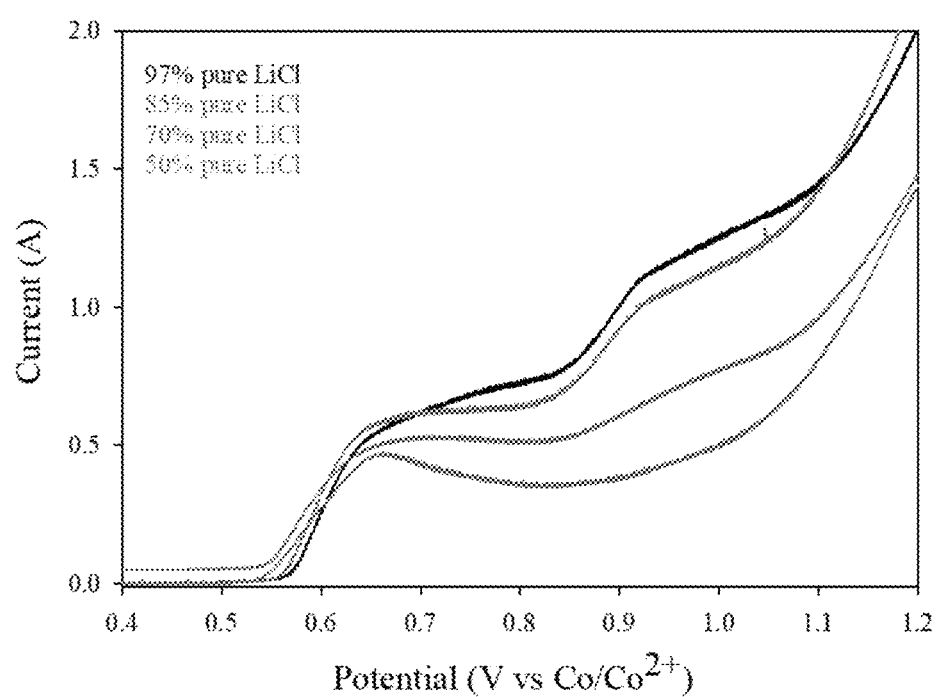
FIG. 5. Cyclic voltammetry of LiCl (97%)/KOH, LiCl (85%)/KOH, LiCl (70%)/KOH, LiCl (50%)/KOH baths containing $Co(OH)_2$ at 5 mV/s scan rate at 320° C.
Figure 6:
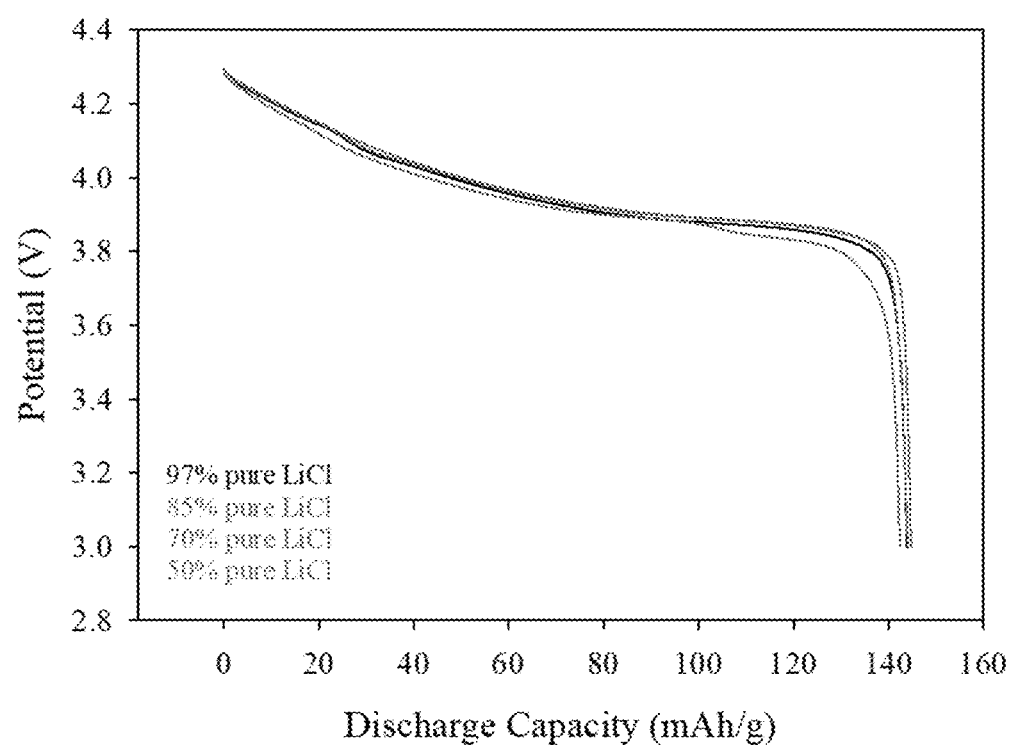
FIG. 6. Discharge profiles of $LiCoO_2$ cathode active materials obtained from LiCl (97%)/KOH, LiCl (85%)/KOH, LiCl (70%)/KOH, LiCl (50%)/KOH baths containing $Co(OH)_2$ at 320° C. The cells were cycled between 4.25 and 3V at C/5 rate.

In another example, FIG. 5 shows the cyclic voltammetries (CVs) of several KOH/LiCl molten salt systems containing different percentages of LiCl impurities (97%, 85% 70% and 50%) in which all of the baths contain $CoOH_2$ species as Co source. The bath temperature was set to 320° C. and the plating procedure was as follows: 1.2V (versus $Co/Co^{2+}$) voltage pulses for 1 s on-time followed by 2 minutes rest between each voltage pulses. This ensured ions to diffuse inner pores of 3D scaffold, SSF working electrode, leading to conformal LCO plating. Approximately, 20 cycles of these pulse plating procedures resulted in a 2 mAh/cm$^2$ loaded electrodes with around 145 mAh/g specific capacities, bode well with the standard values in the literature. The 85%, 70% and 50% pure LiCl powders were prepared by mixing appropriate percentages of NaCl, KCl and CaCl with 97% pure LiCl. These impurities were selected as LiCl is usually refined through brines which contain alkali chloride ions heavily (see *Extraction of lithium from primary and secondary sources by pre-treatment, leaching and separation: A comprehensive review*, Pratima Meshram, B. D. Pandey, T. R. Mankhand, *Hydrometallurgy* 150 (2014) 192-208). The weight percentages of the impurities were set as NaCl/KCl/CaCl w/w 1/0.5/0.5, respectively. The Pt foil working electrode is employed to evaluate if there are any side reactions stemming from impurities of LiCl precursors. As can be seen from CV profiles, in all cases $Co^{2+}$ ions oxidize at relatively similar potentials i.e. 0.6V. All three profiles in FIG. 1 resemble each other suggesting that there are most likely no electrochemically active impurities present during electroplating. The intensity of the oxidation peak around 1V could correspond to complexed $[Co(OH)_6]^{4-}$ and appears to decrease as the impurity percentages increase due to some cation hindrance. This however does not affect the final product as will be discussed below. From these results the eutectic bath is stable for plating $LiCoO_2$ up until 1.4 V vs. $Co/Co^{2+}$. We find the optimum voltage pulse to be 1.2V versus Co reference electrode. All voltage values are reported versus $Co/Co^{2+}$ pseudo reference electrode. As can be seen from FIG. 6, discharge capacities of $LiCoO_2$ electrodes obtained from different impurity ranges of LiCl delivered identical values which was around 145 mAh/g. The voltage profiles also resembled each other suggesting that NaCl, KCl and CaCl impurities do not have adverse effect on $LiCoO_2$.

Figure 7:
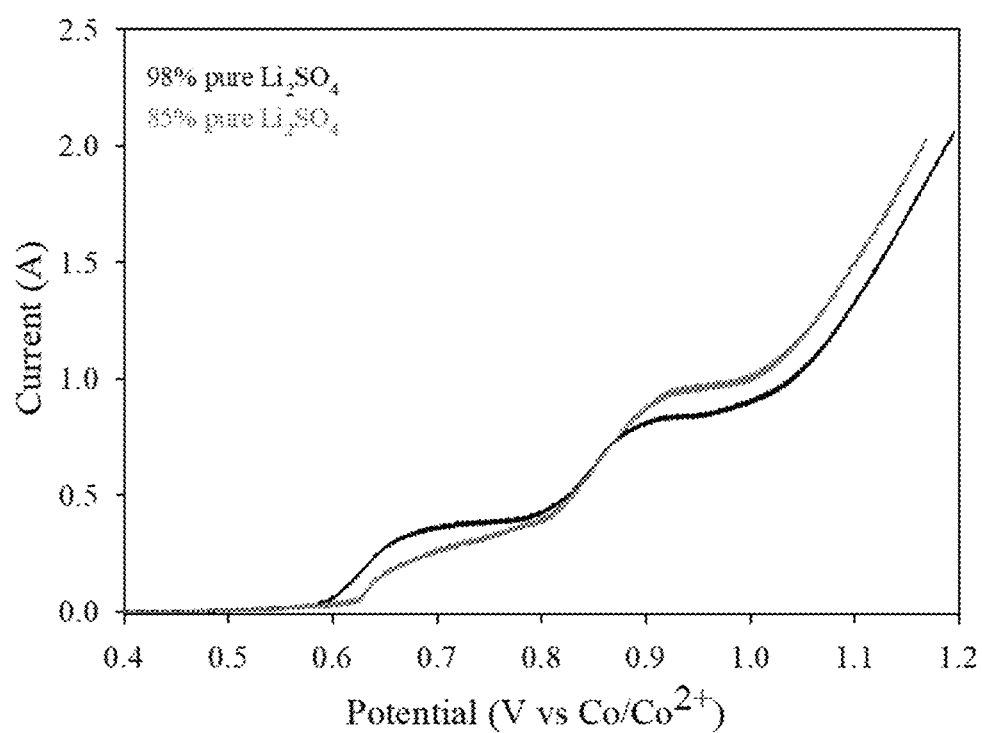
FIG. 7. Cyclic voltammetry of $Li_2SO_4$ (98%)/KOH and $Li_2SO_4$ (85%)/KOH baths containing $Co(OH)_2$ at 5 mV/s scan rate at 350° C.
Figure 8:
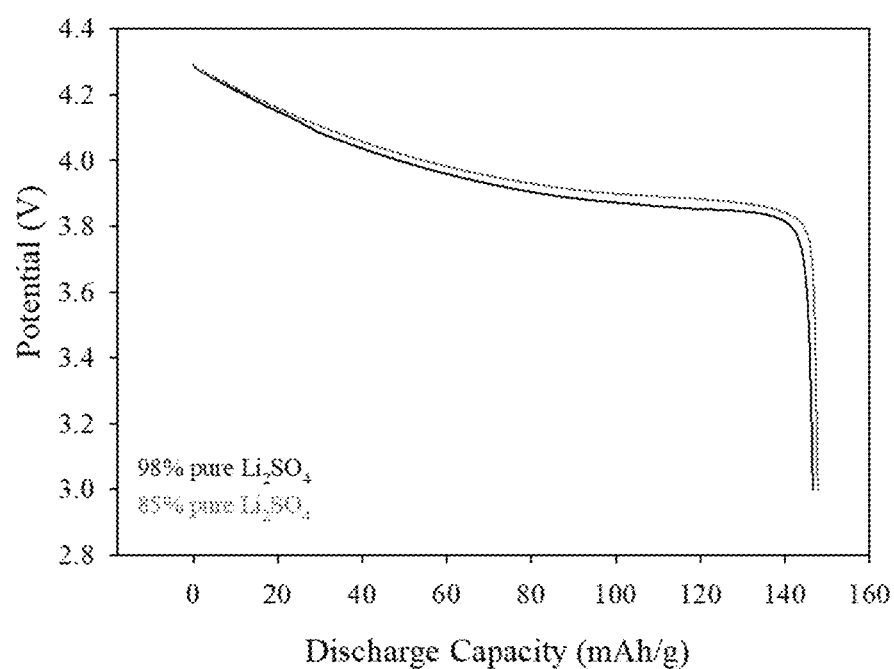
FIG. 8. Discharge profiles of $LiCoO_2$ cathode active materials obtained from $Li_2SO_4$ (98%)/KOH and $Li_2SO_4$ (85%)/KOH baths containing $Co(OH)_2$ at 350° C. The cells were cycled between 4.25 and 3V at C/5 rate.

In another example, FIG. 7 shows the CVs of two $KOH/Li_2SO_4$ molten salt systems containing different percentages of $Li_2SO_4$ impurities (98% and 85%) in which both of the baths contain $CoOH_2$ species as Co source. The bath temperature was set to 350° C. and the plating procedure was as follows: 1.2V (versus $Co/Co^{2+}$) voltage pulses for 1 s on-time followed by 2 minutes rest between each voltage pulses. This ensured ions to diffuse inner pores of 3D scaffold, SSF working electrode, leading to conformal LCO plating. Approximately, 20 cycles of these pulse plating procedures resulted in a 2 mAh/cm² loaded electrodes with around 145 mAh/g specific capacities, standard values in the literature. The 85% pure $Li_2SO_4$ powders were prepared by mixing appropriate percentages of $Al_2O_3$ and $SiO_2$ with 98% pure $Li_2SO_4$. $Al_2O_3$ and $SiO_2$ were reported as common impurities of $Li_2SO_4$ in literature. These impurities were selected as $Li_2SO_4$ is usually refined through an ore which contains spodumene, known as lithium-aluminum-silicate (see *Extraction of lithium from primary and secondary sources by pre-treatment, leaching and separation: A comprehensive review*, Pratima Meshram, B. D. Pandey, T. R. Mankhand. *Hydrometallurgy* 150 (2014) 192-208). The weight percentages of the impurities were set as $Al_2O_3/SiO_2$ w/w 1/1, respectively. In addition to these two major impurities there are other impurities present in $Li_2SO_4$. These impurities are at the ppm level and consisted of the following elements: Ca, Cd, Co, Cr, Cu, Fe, K, Mg, Mn, Na, Ni, Pb, Zn and Cl—. The Pt foil working electrode is employed to evaluate if there are any side reactions stemming from impurities of $Li_2SO_4$ precursors. As can be seen from CV profiles, in all cases $Co^{2+}$ ions start to oxidize at relatively similar potentials i.e. 0.6V. All three CV profiles in FIG. 7 resemble each other suggesting that no electrochemically active impurities are present during electroplating. From these results the eutectic bath is stable for plating $LiCoO_2$ nano-flakes to 1.4 V vs. $Co/Co^{2+}$. We find the optimum voltage pulse to be 1.2V versus Co reference electrode. All voltage values are reported versus $Co/Co^{2+}$ pseudo reference electrode. As can be seen from FIG. 8, discharge capacities of $LiCoO_2$ electrodes obtained from different impurity ranges of $Li_2SO_4$ delivered identical values which is around 145 mAh/g. The voltage profiles also resembled each other suggesting that $Al_2O_3$ and $SiO_2$ impurities and other ppm level of impurities do not have adverse effect on $LiCoO_2$.

Figure 9:
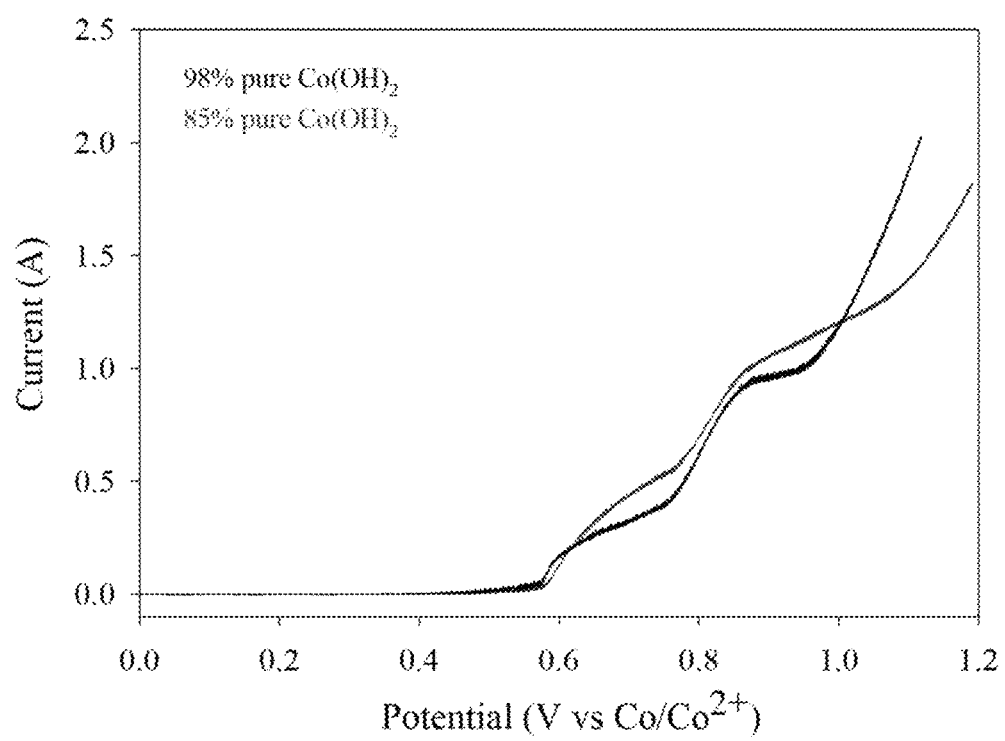
FIG. 9. Cyclic voltammetry of LiOH/KOH baths containing 98% pure $Co(OH)_2$ and 85% pure $Co(OH)_2$ at 5 mV/s scan rate at 260° C.
Figure 10:
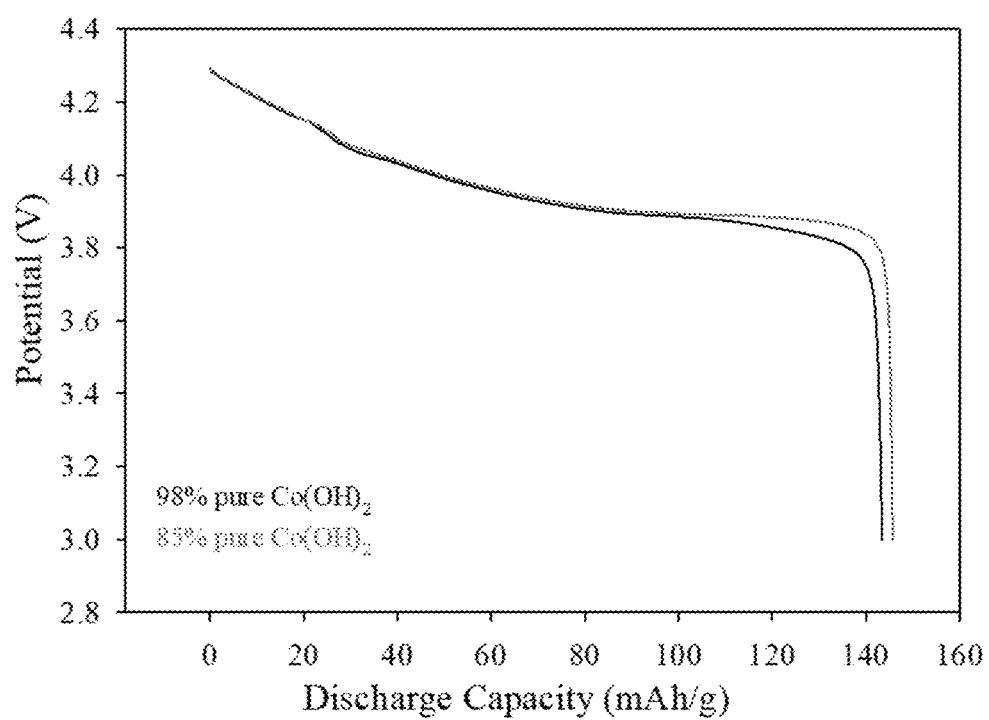
FIG. 10. Discharge profiles of $LiCoO_2$ cathode active materials obtained from LiOH/KOH baths containing 98% pure $Co(OH)_2$ and 85% pure $Co(OH)_2$ at 260° C. The cells were cycled between 4.25 and 3V at C/5 rate.

In another example, FIG. 9 shows the CVs of two KOH/LiOH molten salt systems containing different purity percentages of $Co(OH)_2$ impurities (98% and 85%) in which the bath temperature was set to 260° C. and the plating procedure was as follows: 1.2V (versus $Co/Co^{2+}$) voltage pulses for 1 s on-time followed by 2 minutes rest between each voltage pulses. This ensured ions to diffuse inner pores of 3D scaffold, SSF working electrode, leading to conformal LCO plating. Approximately, 20 cycles of these pulse plating procedures resulted in a 2 mAh/cm² loaded electrodes with around 145 mAh/g specific capacities, standard values in the literature. The 85% pure $Co(OH)_2$ powders were prepared by mixing 98% $Co(OH)_2$ powders with the appropriate percentages of $CoSO_4$ and $Mg(OH)_2$, commonly found impurities in $Co(OH)_2$ (see Processing Considerations for Cobalt Recovery from Congolese Copperbelt Ores, B Swartz, S. Donegan, S. Amos, Hydrometallurgy Conference 2009, The Southern African Institute of Mining and Metallurgy, 2009). The weight percentages of the $CoSO_4$ and $Mg(OH)_2$ impurities were 1/1. The Pt foil working electrode is employed to evaluate if there are any side reactions stemming from impurities of $Co(OH)_2$ precursors. As can be seen from CV profiles, in all cases $Co^{2+}$ ions are started to be oxidized at relatively similar potentials i.e. 0.6V. All three CV profiles in FIG. 9 resemble each other suggesting that no electrochemically active impurities are present during electroplating. From these results the eutectic bath is stable for plating LiCoO2 nano-flakes to 1.4 V vs. $Co/Co^{2+}$. We find the optimum voltage pulse to be 1.2V versus Co reference electrode. All voltage values are reported versus $Co/Co^{2+}$ pseudo reference electrode. As can be seen from FIG. 10, discharge capacities of $LiCoO_2$ electrodes obtained from different impurity ranges of $Co(OH)_2$ delivered identical values which is around 145 mAh/g. Voltage profiles, an indication of structural integrity, also resembled each other suggesting that $CoSO_4$ and $Mg(OH)_2$ impurities and other ppm level of impurities do not have adverse effect on $LiCoO_2$.

Figure 11:
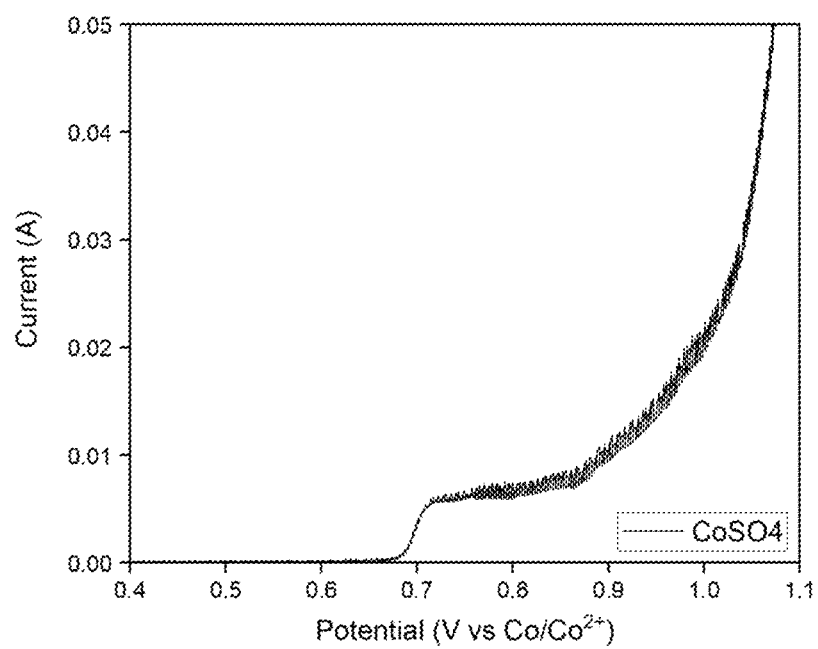
FIG. 11. Cyclic voltammetry of LiOH/KOH baths containing 95% pure $Co(SO)_4$ at 5 mV/s scan rate at 260° C.
Figure 12:
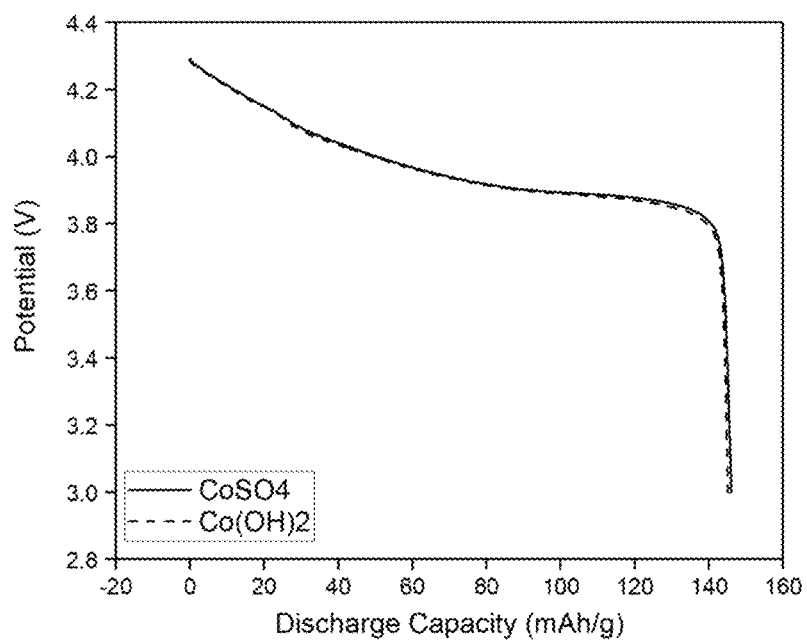
FIG. 12. Discharge profiles of $LiCoO_2$ cathode active materials obtained from LiOH/KOH baths containing 98% pure $Co(OH)_2$ and 95% pure $Co(SO)_4$ at 260° C. The cells were cycled between 4.25 and 3V at C/5 rate.

In another example, FIG. 11 shows the CVs of two KOH/LiOH molten salt systems containing low purity (95% pure) percentage of $Co(SO)_4$ in which the bath temperature was set to 260° C. and the plating procedure was as follows: 1.2V (versus $Co/Co^{2+}$) voltage pulses for 1 s on-time followed by 2 minutes rest between each voltage pulses. This ensured ions to diffuse inner pores of 3D scaffold, SSF working electrode, leading to conformal LCO plating. Approximately, 20 cycles of these pulse plating procedures resulted in a 2 mAh/cm² loaded electrodes with around 145 mAh/g specific capacities, standard values in the literature. The Pt foil working electrode is employed to evaluate if there are any side reactions stemming from impurities of $Co(SO)_4$ precursors. As can be seen from CV profiles, in all cases $Co^{2+}$ ions are started to be oxidized at relatively similar potentials i.e. 0.6V. CV profile in FIG. 11 resemble $CoOH_2$ based eutectic bath suggesting that $CoSO_4$ can also be utilized as Co source. As can be seen from FIG. 12, discharge capacities of $LiCoO_2$ electrodes obtained from different Co source, namely $CoOH_2$ and $CoSO_4$ delivered identical values which is around 145 mAh/g. Voltage profiles, an indication of structural integrity, also resembled each other suggesting that using either $CoOH_2$ or $CoSO_4$ do not have adverse effect on $LiCoO_2$.

What is claimed is:

1. A method of forming a lithiated transition metal oxide onto the surface of a working electrode comprising the steps of:
    (a) immersing a working electrode into a non-aqueous electrolyte comprising a lithium source and a transition metal source, wherein said lithium and transition metal sources have a purity ranging from about 50% to about 95% by weight;
    (b) electrodepositing a lithiated transition metal oxide onto a surface of the working electrode from the electrolyte at a temperature in excess of the melting temperature of the non-aqueous electrolyte;
    (c) removing the working electrode from the bath and;
    (d) rinsing the electrodeposited lithiated transition metal oxide.

2. The method of claim 1 wherein the low purity lithium and transition metal sources have a purity ranging from about 50% to about 85% by weight.

3. The method of claim 1 wherein the low purity lithium source is selected from the group consisting of LiOH, $Li_2CO_3$ LiF, LiCl, LiBr, LiI, $LiNO_3$, $LiNO_2$, $Li_2SO_4$, and combinations thereof.

4. The method of claim 1 wherein the low purity transition metal source is selected from the group consisting of $MnCl_2$, $MnSO_4$, $Mn_2O_3$, $MnO_2$, $Mn_3O_4$, $Mn(NO_3)_2$, CoO, $Co_2O_3$, $Co_3O_4$, $CoOH_2$, $CoCl_2$, $CoSO_4$, $Co(NO_3)_2$ and combinations thereof.

5. The method of claim 1 wherein the non-aqueous electrolyte comprises an inorganic molten salt.

6. The method of claim 5 wherein at least 50% of the ions comprised by the inorganic molten salt electrolyte are inorganic ions.

7. The method of claim 5 wherein the inorganic molten salt electrolyte comprises a hydroxide salt, a halide salt, a sulfate salt, a nitrate salt, a nitrite salt, and combinations thereof.

8. The method of claim 7 wherein the inorganic molten salt electrolyte comprises a hydroxide salt selected from the group consisting of $Li_2SO_4$, LiOH, KOH, NaOH, RbOH, and CsOH, a halide salt selected from the group consisting of LiCl, LiF, KF, KCl, NaCl, NaF, LiBr, NaBr, KBr, LiI, NaI, KI, a nitrate salt selected from the group consisting of $LiNO_3$, $NaNO_3$, and $KNO_3$, a nitrite salt selected from the group consisting of $LiNO_2$, $NaNO_2$, $KNO_2$, a $Li_2SO_4$ sulfate salt, and combinations thereof.

9. The method of claim 8 wherein the inorganic molten salt electrolyte comprises a hydroxide salt selected from the group consisting of LiOH, KOH, NaOH, and combinations thereof.

10. The method of claim 8 wherein the inorganic molten salt electrolyte comprises a $Li_2SO_4$ sulfate salt.

11. The method of claim 1 wherein the working electrode comprises an electrically conductive material selected from the group consisting of metals, metal alloys, metallic ceramics, electrically conductive carbon, electrically conductive polymers, and electrically conductive composite materials.

12. The method of claim 11 wherein the working electrode is a planar foil with thickness ranging from 1 μm to 100 mm.

13. The method of claim 11 wherein the working electrode is a porous foam with porosity ranging from 1% to 99% porosity.

14. The method of claim 11 wherein the working electrode is a metal or metal alloy selected from the group consisting of aluminum, copper, chromium, cobalt, manganese, nickel, silver, gold, tin, platinum, palladium, zinc, tungsten, tantalum, rhodium, molybdenum, titanium, iron, zirconium, vanadium, and hafnium, and the alloys thereof.

15. The method of claim 1 wherein the source of the transition metal in the plating bath comprises an oxide, halide or sulfate of at least one transition metal.

16. The method of claim 1 wherein the transition metal source is selected from the group consisting of cobalt, manganese, nickel, copper, iron, chromium, vanadium, titanium, molybdenum, tungsten, and combinations thereof.

17. The method of claim 1 wherein the lithiated transition metal oxide is electrodeposited onto the surface(s) of a three-dimensional working electrode having an open pore porous structure.

18. The method of claim 1 wherein the lithiated transition metal oxide is conformally coated onto the working electrode.

19. The method of claim 1 wherein the thickness of the electrodeposited lithiated transition metal oxide ranges from about 10 nm to about 500 μm.

20. The method of claim 1 wherein the electrodeposited lithiated transition metal oxide is lithium cobalt oxide characterized by an XRD spectrum containing a doublet peak at approximately between 63 and 70 2Θ degrees.

* * * * *